United States Patent
Dodds et al.

(10) Patent No.: US 7,353,222 B2
(45) Date of Patent: Apr. 1, 2008

(54) SYSTEM AND METHOD FOR THE STORAGE, INDEXING AND RETRIEVAL OF XML DOCUMENTS USING RELATIONAL DATABASES

(75) Inventors: David Dodds, Alameda, CA (US); Larry Kuo, San Jose, CA (US); Soumitra Sengupta, Belmont, CA (US); William D. Lindsey, Belmont, CA (US); Nandit Soparkar, Ann Arbor, MI (US)

(73) Assignee: Progress Software Corporation, Bedford, MA (US)

( * ) Notice: Subject to any disclaimer, the term of this patent is extended or adjusted under 35 U.S.C. 154(b) by 440 days.

(21) Appl. No.: 10/745,762

(22) Filed: Dec. 23, 2003

(65) Prior Publication Data

US 2006/0101320 A1    May 11, 2006

(51) Int. Cl.
*G06F 17/30* (2006.01)
(52) U.S. Cl. ................ 707/3; 707/102; 707/101
(58) Field of Classification Search .......... 707/1–10, 707/100–104.1, 200–206; 709/246, 200, 709/219; 717/1
See application file for complete search history.

(56) References Cited

U.S. PATENT DOCUMENTS

| 6,125,391 | A | 9/2000 | Meltzer et al. | |
|---|---|---|---|---|
| 6,154,738 | A | 11/2000 | Call | |
| 6,240,407 | B1 | 5/2001 | Chang et al. | |
| 6,366,934 | B1 | 4/2002 | Cheng et al. | |
| 6,581,062 | B1 | 6/2003 | Draper et al. | |
| 6,643,633 | B2 | 11/2003 | Chau et al. | |
| 6,704,736 | B1 | 3/2004 | Rys et al. | |
| 6,721,727 | B2 | 4/2004 | Chau et al. | |
| 6,785,673 | B1* | 8/2004 | Fernandez et al. | 707/3 |
| 6,862,590 | B2* | 3/2005 | Nonko et al. | 707/3 |

OTHER PUBLICATIONS

Freed, N. et al., "Multipurpose Internet Mail Extensions (RFC 2045)", Nov. 1996, [online] [Retrieved on Jan. 23, 2006] Retrieved from the Internet <URL: http://www.oac.uci.edu/indiv/ehood/MIME/2045/rfc2045.html>.

Shanmugasundaram, J. et al., "Relational Databases for Querying XML Documents: Limitations and Opportunities," Proceedings of the 25th International Conference on Very Large Data Bases (VLDB), Sep. 7-10, 1999, Edinburgh, Scotland, pp. 302-314.

Florescu, Daniela, et al., "A Performance Evaluation of Alternative Mapping Schemes for Storing XML Data in a Relational Database", Institut National De Recherche En Informatique Et En Automatique (INRIA) Research Report No. 3680, Aug. 3, 1999, Rocquencourt, France.

(Continued)

*Primary Examiner*—Yicun Wu
(74) *Attorney, Agent, or Firm*—Fenwick & West LLP

(57) ABSTRACT

A system and method for assigning attributes to XML document nodes to facilitate their storage in relational databases and the subsequent retrieval and re-construction of pertinent nodes and fragments in original document order is provided. Since these queries are performed using relational database query engines, the speed of their execution is significantly faster than that using more exotic systems such as object-oriented databases. Furthermore, this method is portable across all vendor platforms, and so can be deployed at client sites without additional investments in database software.

20 Claims, 3 Drawing Sheets

OTHER PUBLICATIONS

Shimura, Takeyuki, et al., "Storage and Retrieval of XML Documents Using Object-Relational Databases", Proceedings of the 10th International Conference on Database and Expert Systems Applications, Aug. 30-Sep. 3, 1999, pp. 206-217.

International Search Report, Application No. PCT/US00/42665, May 25, 2001.

International Preliminary Examination Report, Application No. PCT/US00/42665, Aug. 20, 2001.

Brandon, D., "Recursive Database Structures," Journal of Computing Sciences in Colleges, vol. 21, No. 2, Dec. 2005, pp. 295-304.

Celko, J., "Hierarchical SQL," ONLamp.com, Aug. 5, 2004, [online] [Retrieved Feb. 3, 2007] Retrieved from the Internet <URL: http://www.onlamp.com/lpt/a/5007>.

Jonsson, L., "Representing Trees in a Relational DB," Apr. 7, 2001, [online] [Retrieved Feb. 3, 2007] Retrieved from the Internet <URL: http://fungus.teststation.com/~jon/treehandling/TreeHandling.doc>.

Thomas, R., "Path Enumeration Using Prime Number Products," Top 1 with Ties, Mar. 14, 2005, [online] [Retrieved Feb. 3, 2007] Retrieved from the Internet <URL: http://toponewithties.blogspot.com/2005/03/path-enumeration-using-prime-number.html>.

Tropashko, V., "Trees in SQL: Nested Sets and Materialized Path," DBAzine.com, last modified Apr. 13, 2005, [online] [Retrieved Feb. 3, 2007] Retrieved from the Internet <URL: http://www.dbazine.com/oracle/or-articles/tropashko4>.

Volk, R., "More Trees & Hierarchies in SQL," SQLTeam.com, May 1, 2002, [online] [Retrieved Feb. 3, 2007] Retrieved from the Internet <URL: http://www.sqlteam.com/itemprint.asp?ItemID=8866>.

\* cited by examiner

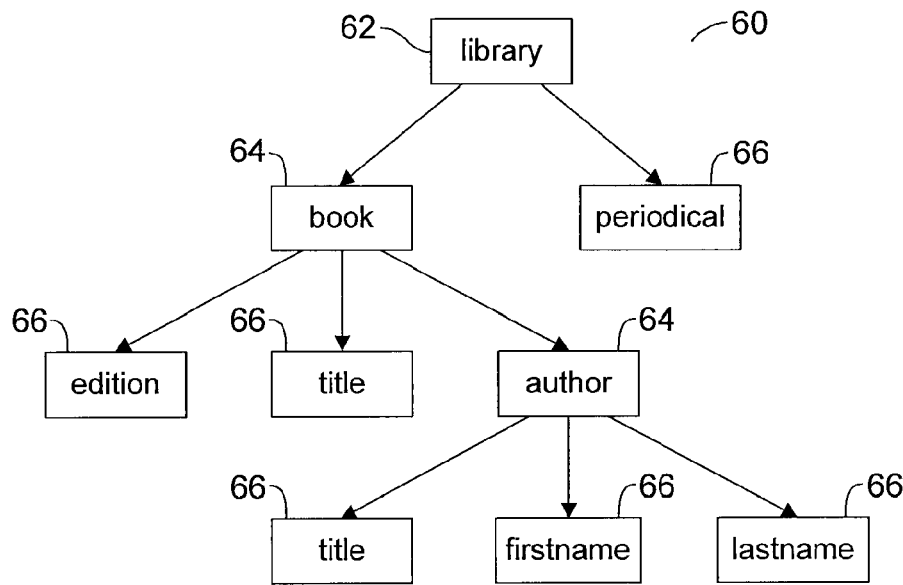

FIG. 3

```
                                                           ⁄−70
     <library>
           <book edition='first'>
                   <title>The XML Revolution</title>
                   <author>
                            <title>Software Engineer</title>
                            <firstname>David</firstname>
                            <lastname>Hollenbeck</lastname>
                   </author>
                   <author>
                            <title>Chief Architect</title>
                            <firstname>Carol</firstname>
                            <lastname>Bohr</lastname>
                   </author>
           </book>
           <book edition='second'>
                    <title>Java Classes for XML</title>
                    <author>
                            <firstname>Carol</firstname>
                            <lastname>Hollenbeck</lastname>
                    </author>
                    <author>
                            <title>XML Guru</title>
                            <firstname>David</firstname>
                            <lastname>Bohr</lastname>
                    </author>
           </book>
     </library>
```

FIG. 4

SYSTEM AND METHOD FOR THE STORAGE, INDEXING AND RETRIEVAL OF XML DOCUMENTS USING RELATIONAL DATABASES

PRIORITY CLAIM

This application claims priority to U.S. patent application Ser. No. 09/730,892, filed on Dec. 5, 2000 by David Dodds, et al. and U.S. patent application Ser. No. 60/169,101, filed on Dec. 6, 1999 by David Dodds, et al.

BACKGROUND OF THE INVENTION

This invention relates generally to a system and method for storing documents in one format in a database having a different format and in particular to a system and method for storing and retrieving extensible Markup Language (XML) documents using a relational database.

The new extensible Markup Language (XML) protocol is poised to become the lingua franca of the Internet for capturing and electronically transmitting information. The advantage of XML, as compared to the older hypertext markup language protocol (HTML), is that it contains tags which render semantic significance to the information between the tags (e.g., the text between the tags is the last name of an author). In contrast, HTML tags are used primarily for specifying how the information is to be displayed in a browser (e.g., show the text between the tags in bold Arial font). Additionally, using known extensible Stylesheets (written in XSL), one may specify not only the format of how different XML elements are to be shown in a browser, but also the order in which they are to be displayed. These features of XML give a user much greater power and flexibility in searching for relevant information since a search may be performed using the tags that contain the semantic information. In addition, XML permits examining the information from different perspectives once it is found by the user.

To take full advantage of the possibilities that the XML protocol affords, it is desirable to devise an efficient means of storing, indexing and retrieving (via queries) XML documents. Typical RDMS, ODMS and flat files are slow and inefficient at storing XML documents. A preferred way of building Document Object Model (DOM) representations of the XML documents and then traversing the resulting trees to locate relevant nodes is only acceptable for small documents since memory becomes a limiting factor when the XML documents approach even moderate sizes. In addition, searches are not optimal since all searches must begin at the root of the document instead of at any node in the document. Moreover, it is not possible to search across a collection of documents (e.g. poems, novels, short stories and plays) for a particular character or the author.

At the same time, XML documents present unique challenges to storage in relational databases since their semi-structured nature often leads to a proliferation of tables when normalization is carried out. Given that relational database technology has seen great strides over the past couple of decades, it would be desirable and useful to provide a clean way of representing XML documents in relational terms. It is therefore the goal of the present invention to provide a system and method for the storage, indexing and retrieval of XML documents using relational databases.

SUMMARY OF THE INVENTION

A system and method for storing, indexing and retrieving XML documents in a relational database is provided in accordance with the invention. The method may include identifying and assigning properties and encodings to the nodes of an XML document that will make them amenable to storage and retrieval using relational databases. The method has several advantages. It allows the system to capture and reproduce the structure of not only the whole document, but fragments of each document as well. It also permits a user to traverse the XML tree, figuratively, by means of string manipulation queries instead of following pointers in memory or computing joins between tables, which are computationally more expensive operations. Finally, the properties and encodings that are attached to the nodes are compact and can be effectively indexed, thus enhancing the performance of queries against the database.

The system in accordance with the invention uses any relational database management system to store the XML documents so that the system and method are not dependent on any particular relational database implementation. The system permits a user to search through the XML documents stored in the relational database from any node element without starting from the root element of the document. This provides optimal efficiency during search and retrieval that cannot be obtained using other methods today. In addition, a document may be constructed from any node and its descendants. The system also permits documents conforming to any XML schema to be stored in an efficient manner. The system can also store any well-formed XML document that does not conform to any schema or DTD (Document Type Definition). This is an important feature as a large majority of XML documents generated do not conform to a schema or DTD.

In accordance with the invention, the system may include a converter and a searcher that permit XML documents to be stored in the relational database and retrieved from a relational database using typical SQL queries. In a preferred embodiment, the converter and searcher may be one or more software modules being executed by a central processing unit on a computer system. In accordance with the invention, the method for storing the XML documents may include the steps of generating an XMLName value for each element in the document tree, generating a NamePath value for each node of the document and generating an OrderPath value for each node of the document. Collectively, assigned values to these elements are called encodings. These encodings result in efficient storage, indexing and searching of XML documents without destroying the underlying hierarchical structure of the documents. The retrieval of the XML documents once they are in the relational database is relatively easy since typical string matching SQL queries may be used.

Thus, in accordance with the invention, a computer system and method for manipulating an XML document using a relational database is provided. The system comprises a converter that receives an XML document and generates a set of relational database tables based on the hierarchical structure of XML, a database for storing the relational database tables, and a searcher for querying the generated relational database table in the database to locate content originally in the XML document that is now stored in the relational database tables wherein the located content is returned to the user as an XML document or a portion of an XML document as desired by the user which can be another software module. The invention also includes the searcher that can convert queries specified on the XML document or document collections and convert them to simple SQL queries to retrieve the content desired by the user.

In accordance with another aspect of the invention, a computer system for storing an XML document using a relational database is provided wherein the system comprises a converter that receives an XML document and generates relational database tables based on the structure of the XML document. The converter further comprises a software module that generates a unique name attribute for each node in the XML document, a software module that generates a path attribute for a particular node of the XML document wherein the path attribute comprises a list of the name attributes for the one or more nodes from the particular node to a root node of the XML document, a software module that generates an order attribute for the particular node, the order attribute comprising an enumerated order of the particular node from the root node to the particular node, and a software module that generates a NodeValue attribute containing a value of the particular node. Collectively these attributes are called encodings that result in efficient storage, indexing and searching of XML documents without destroying the underlying hierarchical structure of the documents.

In accordance with yet another aspect of the invention, a data structure that stores a node of interest of an XML document in a relational database is provided. The data structure comprises an XMLName attribute comprising a unique name for the node of interest, a NamePath attribute comprising a list of the XMLName attributes for the one or more nodes from the node of interest to a root node of the XML document, an OrderPath attribute comprising an enumerated order of the node of interest from the root node to the node of interest, and a NodeValue attribute containing a value of the node of interest. Collectively these attributes are called encodings that result in efficient storage, indexing and searching of XML documents without destroying the underlying hierarchical structure of the documents.

BRIEF DESCRIPTION OF THE DRAWINGS

FIG. 3 is a diagram illustrating an example of a document type definition (DTD) tree for an XML document;

FIG. 4 is a diagram illustrating an document corresponding to the table shown in FIG. 3;

DETAILED DESCRIPTION OF A PREFERRED EMBODIMENT

The invention is particularly applicable to a software implemented XML document storage and retrieval system and method and it is in this context that the invention will be described. It will be appreciated, however, that the system and method in accordance with the invention has greater utility since it may be implemented in hardware instead of software.

Figure 1:
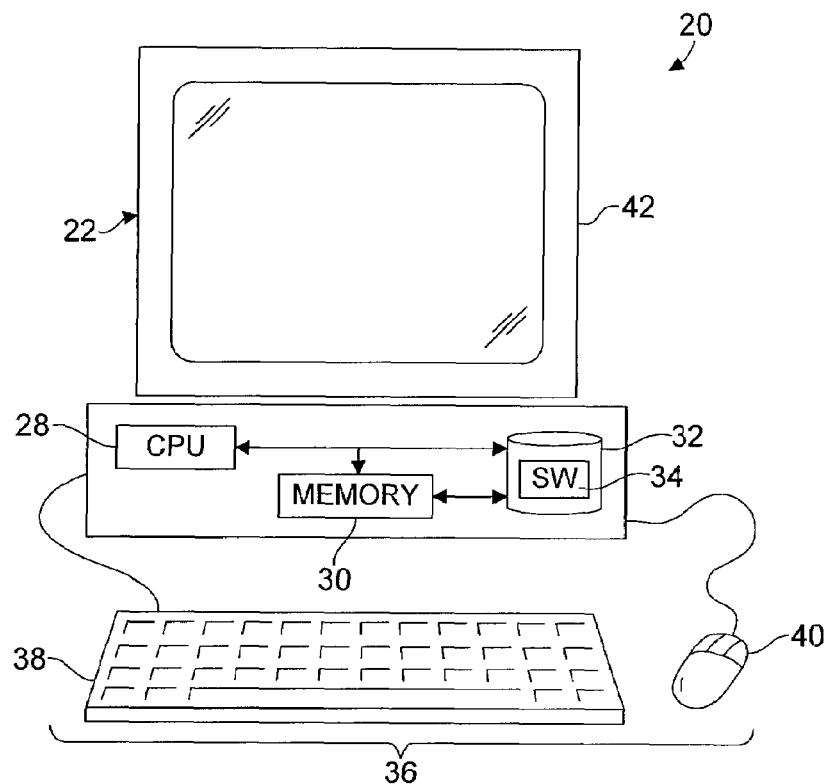
FIG. 1 is a diagram illustrating a personal computer implementation of an XML document storage and retrieval system in accordance with the invention.

FIG. 1 is a block diagram illustrating an embodiment of a software-based XML document storage and retrieval system 20 in accordance with the invention. In this embodiment, the storage and retrieval system 20 may be executed by a computer 22. The computer 22 may be a typical stand-alone personal computer, a computer connected to a network, a client computer connected to a server or any other suitable computer system. For purposes of illustration only, an embodiment using a stand-alone computer 22 will be described herein.

The computer 22 may include a central processing unit (CPU) 28, a memory 30, a persistent storage device 32, such as a hard disk drive, a tape drive, an optical drive or the like and a storage and retrieval system 34. In a preferred embodiment, the storage and retrieval system may be one or more software applications stored in the persistent storage device 32 of the computer that may be loaded into the memory 30 so that the storage and/or retrieval functionality of the storage and retrieval system may be executed by the CPU 28. The computer 22 may be connected to a remote server or other computer networks that permit the computer 22 to network with and share the stored XML document with other computers or to perform searches on XML stored documents on other computer systems.

The computer 22 may further include one or more input devices 36, such as a keyboard 38, a mouse 40, a joystick or the like, a display 42 such as a typical cathode ray tube, a flat panel display or the like and one or more output devices (not shown) such as a printer for producing printed output of the search results. The input and output devices permit a user of the computer to interact with the storage and retrieval system so that the user may, for example, enter a query using the input devices and view the results of the query on the display or print the query results.

As described below in more detail, the storage and retrieval system 34 may include one or more different software modules that provide XML document storage capabilities and XML document retrieval capabilities in accordance with the invention. Now, more details of the storage and retrieval system will be described.

Figure 2:
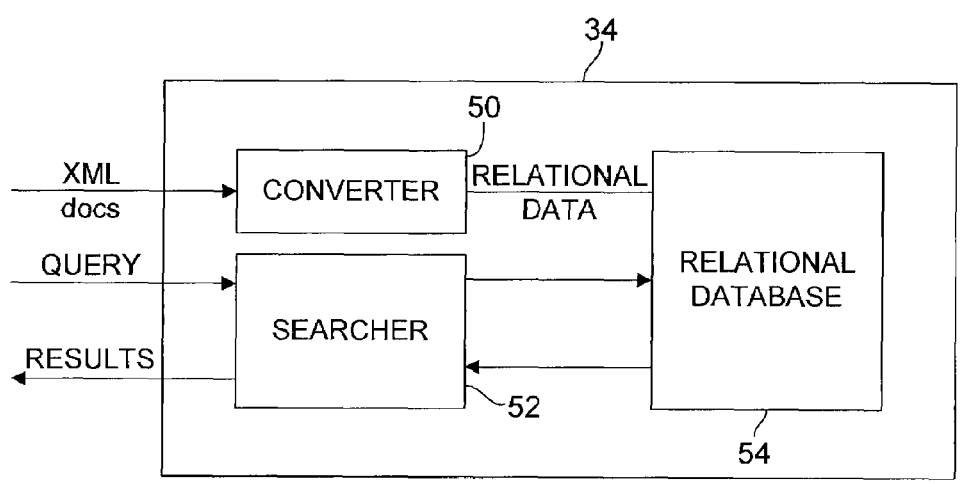
FIG. 2 is a diagram illustrating more details of the XML document storage and retrieval system in accordance with the invention.

FIG. 2 is a diagram illustrating more details of the XML document storage and retrieval system 34 in accordance with the invention. The system may include a converter module 50, a searcher module 52 and a relational database 54. Each of the modules may be implemented, in a preferred embodiment, as a software application being executed by a CPU as described above. The relational database 54 may be any type of relational database so that the system 34 in accordance with the invention may be used to store XML documents in any relational database system.

The converter module 50 accepts XML documents, processes them and outputs relational data about the XML documents as described below that is stored in the typical relational database 54. The searcher module 52 generates a user interface to a user, permits the user to enter a text string type relational database query, processes the query by communicating a query to the relational database 54 and sends the results of the query in its original XML form to the user so that the user may view or print the query results. In combination, the two modules shown permit XML documents to be stored in any relational database system and then permit a user to enter a typical text string relational database query in order to retrieve XML documents from the relational database that match the text string query. Each of these modules will be described in more detail below. Now, an example of a Document Type Definition (DTD) of an XML document will be described to better understand the invention. This example of the DTD will be used as an example to illustrate the storage and retrieval system in accordance with the invention.

FIG. 3 is a diagram illustrating an example of a Document Type Definition (DTD) tree 60 for an XML document. Although not required to do so, an XML document typically conforms to a DTD which, loosely speaking, is a schema for the data found in the document. However, XML documents are semi-structured in the sense that there are elements specified in the DTD that may be optionally present and some that may be present more than once. This is in contrast to typical relational database tables where each record must have either zero (if it is NULL) or only one value for an attribute.

XML documents also resemble an object-oriented database in that there are parent-child relationships between elements which are not found between attributes in a relational database. The following example of an XML document should help make these distinctions more clear. An example of the XML DTD syntax may be:

```
<!ELEMENT library (book*, periodical*)>
<!ELEMENT book (title, author+)>
<!ATTLIST book edition CDATA #REQUIRED>
<!ELEMENT author (title?, firstname, lastname)>
```

In the above example, elements that appear within parentheses are the children of elements before the parentheses. In addition a "*" denotes 0 or more occurrences of the element, a "+" denotes one or more occurrences and a "?" denotes 0 or 1 occurrence. The above example DTD may be represented by the DTD tree shown in FIG. 3. The DTD tree 60 may include a root node 62 (containing the element "library" in this example), one or more intermediate nodes 64 and one or more leaf nodes 66 that do not have any further nodes attached to them. An example of an XML document 70 that conforms to the DTD is shown in FIG. 4. It contains the instances of elements in the DTD tree along with data for each element. The conversion of this example of an XML document into a format that may be stored in a relational database in accordance with the invention will now be described.

Figure 5:
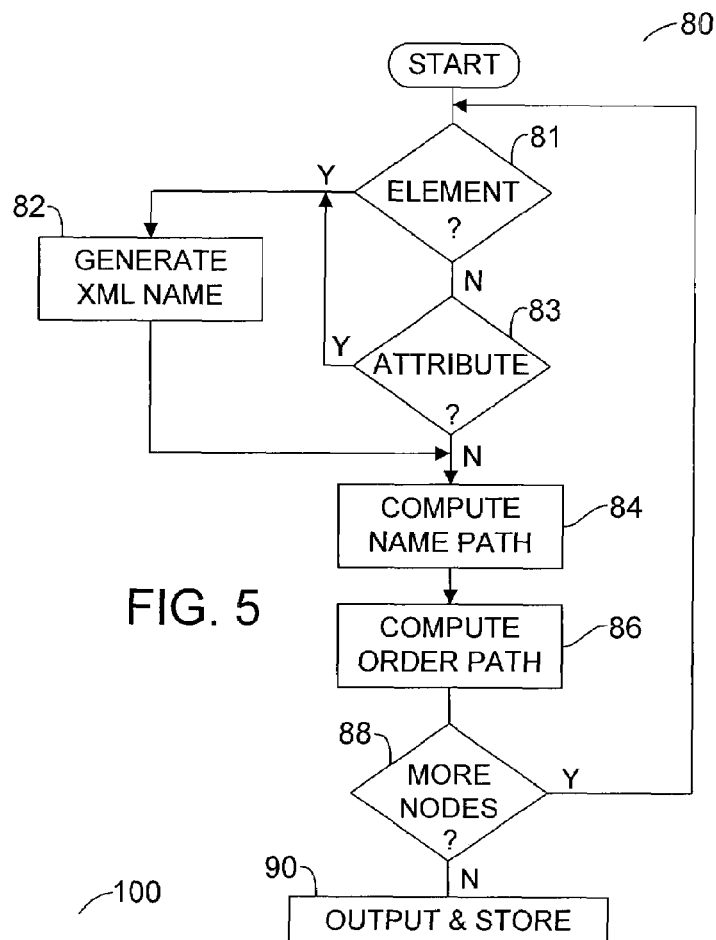
FIG. 5 is a flowchart illustrating an example of a method for storing XML documents in a relational database in accordance with the invention.

FIG. 5 is a flowchart illustrating an example of a method 80 for storing XML documents in a relational database in accordance with the invention. The method involves computing three properties, each of which is described below, for each XML document node so that the XML document may be stored, in an efficient manner, in a relational database. The encoding scheme set forth below is a preferred encoding embodiment. However, other encoding schemes may also be used. For example, the encoding set forth below (e.g., 1/2/5/6) may be represented as 1 raised to the power 1, 2 raised to the power 2, 3 raised to the power 5 and 4 raised to the power 6 and so on. That way, instead of performing string manipulation, the system would be doing factorization. Based on this other encoding, the factorization approach can generate faster queries and save indexing and database space. Thus, the invention is not limited to any particular encoding and the encodings in accordance with the invention are created based on the structure of the document and then the encodings are used to store, index and search for the content while preserving the hierarchy of the document.

In a first step 81 of the method, it is determined if an element is ready for processing. If there is an element ready for processing, then the method generates 82 an XMLName property for the particular element. If an element is not ready for processing, but an attribute of the XML document is read 83 for processing, then the method also generates 82 the XMLName property for the particular attribute. In more detail, the method starts by assigning each element name a unique XMLName property (in this example, the property is alphanumeric). For the example above, we could assign the XMLNames as shown in Table 1 (the XMLName Table).

TABLE 1

(the "XMLName Table")

| Element or Attribute Name | XMLName |
| --- | --- |
| library | 1 |
| book | 2 |
| periodical | 3 |
| edition | 4 |
| title | 5 |
| author | 6 |
| firstname | 7 |
| lastname | 8 |

Note that "title" gets only one XMLName value even though the element appears twice in the DTD tree as either the title of a book or the title of an author. This allows for more XMLName attributes to be encoded given strings of a specific length.

Now, in step 84, a NamePath value is automatically determined for each node of the DTD tree. In particular, the NamePath value may be constructed from the XMLNames of each node on the path from the root node to the node of interest. From this analysis, we obtain the following table of NamePath values for the example XML document:

NamePath Table

| DTD Node | NamePath |
| --- | --- |
| library | 1 |
| library/book | 1/2 |
| library/periodical | 1/3 |
| library/book/edition | 1/2/4 |
| library/book/title | 1/2/5 |
| library/book/author | 1/2/6 |
| library/book/author/title | 1/2/6/5 |
| library/book/author/firstname | 1/2/6/7 |
| library/book/author/lastname | 1/2/6/8 |

As shown in the table, each DTD node, such as "library/book/author/lastname", has a corresponding NamePath value, such as "1/2/6/8". In this manner, using the NamePath values, it is possible to navigate through the XML document using the relational database. In other words, using this table, the path to any node in the DTD tree (and hence the XN4L document) may be easily determined. This table may also be stored in the relational database.

Next, in step 86, the method may automatically generate an OrderPath value for each node in the XML document. In particular, each number in the slash-separated OrderPath (see the table below) denotes the breadth-wise enumerated order of the node on the path from the root to the node of interest. Each document node may also inherit the NamePath of the DTD node of which it is an instance. A full DocNode Table for the example XML document looks like this:

DocNode Table

| NodeName | NamePath | OrderPath | NodeValue |
| --- | --- | --- | --- |
| library | 1 | 1 | |
| book | 1/2 | 1/1 | |

-continued

DocNode Table

| NodeName | NamePath | OrderPath | NodeValue |
|---|---|---|---|
| edition | 1/2/4 | 1/1/1 | first |
| title | 1/2/5 | 1/1/2 | The XML Revolution |
| author | 1/2/6 | 1/1/3 | |
| title | 1/2/6/5 | 1/1/3/1 | Software Engineer |
| firstname | 1/2/6/7 | 1/1/3/2 | David |
| lastname | 1/2/6/8 | 1/1/3/3 | Hollenbeck |
| author | 1/2/6 | 1/1/4 | |
| title | 1/2/6/5 | 1/1/4/1 | Chief Architect |
| firstname | 1/2/6/7 | 1/1/4/2 | Carol |
| lastname | 1/2/6/8 | 1/1/4/3 | Bohr |
| book | 1/2 | 1/2 | |
| edition | 1/2/4 | 1/2/1 | second |
| title | 1/2/5 | 1/2/2 | Java Classes for XML |
| author | 1/2/6 | 1/2/3 | |
| firstname | 1/2/6/7 | 1/2/3/1 | Carol |
| lastname | 1/2/6/8 | 1/2/3/2 | Hollenbeck |
| author | 1/2/6 | 1/2/4 | |
| title | 1/2/6/5 | 1/2/4/1 | XML Guru |
| firstname | 1/2/6/7 | 1/2/4/2 | David |
| lastname | 1/2/6/8 | 1/2/4/3 | Bohr |

As shown in the Table that may be stored in a relational database, each document node may include a NodeName value (the name of the element), a NamePath value (See above), an OrderPath Value (automatically generated during this step), and a NodeValue value (containing the actual data in that particular node).

In step 88, the method determines if there are any more nodes to process and loops back to step 81 if there are more nodes. If all of the nodes have been processed, then the DocNode Table may be saved in the relational database. In this manner, an XML document is automatically processed in order to generate a DocNode Table that may be stored in any relational database. Once the DocNode table is generated by the system, it may be searched as will now be described in more detail.

Figure 6:
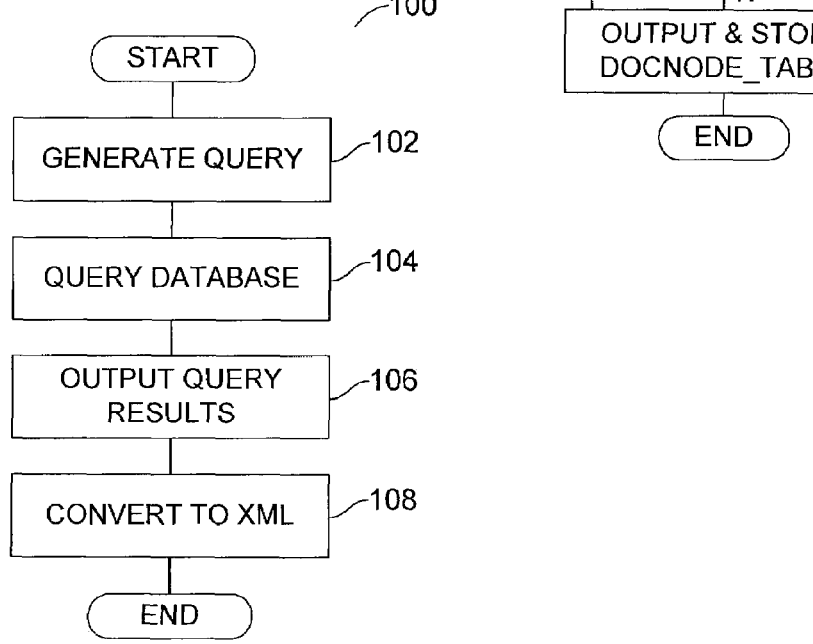
FIG. 6 is a flowchart illustrating a method for retrieving an XML document from a search of a relational database in accordance with the invention.

FIG. 6 is a flowchart illustrating a method 100 for retrieving an XML document from a search of a relational database in accordance with the invention. In step 102, the user or the system using user input, may generate a relational database query. In step 104, the system may query the relational database and in step 106, the query results are output to the user. In accordance with the invention, the system may convert the query results back into references to portions of the XML document so that the user may review the portions of the XML document retrieved during the search in step 108. Now, several examples of retrieving XML documents based on a relational database search will be provided. In particular, a few examples will be shown of how the system may use the NamePath and OrderPath values to select nodes with desired attributes from the XML document repository and also may construct fragments of the original XML documents containing these selected nodes. In all the sample queries below, we assume that we know the context (i.e., the position within the DTD tree) of the nodes we are interested in.

In a first example, a user wants to query the XML document repository to return the titles of all books who have an author with the title of "Chief Architect". Since we know the context of title (i.e., library/book/author/title), we can consult the XMLName Table to obtain the relevant XMLNames and construct the NamePath of title which is "1/2/6/5" in this example. Then, the system may issue the first query that is:

"Select OrderPath from DocNodeTable where Name-Path='1/2/6/5' and NodeValue='Chief Architect'"

This query returns an OrderPath of "1/1/4/1" as the result. Since we also know that the element "book" is a grandparent of the element "title", we can deduce that its Order-Path is 1/1. Finally, we construct the NamePath of the element "book title" as "1/2/5" and execute the second query that is:

"Select NodeValue from DocNodeTable where Name-Path='1/2/5' and OrderPath like '1/1/%'".

This second query returns the value "The XML Revolution" as the result. This result accomplishes the user goal of returning all books whose author's title is "Chief Architect". In this manner, the XML document repository is queried using typical relational database queries.

In this second example, the user wants to search for the titles of all books who have an author by the name of Carol Hollenbeck. To accomplish this, the system may generate a first query to select the OrderPaths of all firstname nodes with the value Carol:

"Select OrderPath from DocNodeTable where Name-Path='1/2/6/7' and NodeValue='Carol'".

This query returns "1/1/4/2" and "1/2/3/1" as the result set. Next, a second query is generated to select the Order-Paths of all lastname nodes with the value Hollenbeck:

"Select OrderPath from DocNodeTable where Name-Path='1/2/6/8' and NodeValue='Hollenbeck'"

This query returns "1/1/3/3" and "1/2/3/2" as the result set. Since we know firstname and lastname nodes of the same person belong to the same parent author node, we can deduce from the result sets that only the nodes with Order-Paths "1/2/3/1" and "1/2/3/2" are of interest to us. Thus, we want the title of the book with OrderPath 1/2, which we can retrieve with the following query:

"Select NodeValue from DocNodeTable where Name-Path='1/2/5' and OrderPath like '1/2/%'"

This query returns "Java Classes for XML" as the result which is the proper result.

In a third example, the user wants to be returned all the information pertaining to the authors of "The XML Revolution" and presented in the original document order. Thus, first, the OrderPath of the relevant title node is determined by the following query:

"Select OrderPath from DocNodeTable where Name-Path='1/2/5' and NodeValue='The XML Revolution'"

This query returns "1/1/2" as the result. Thus, as a result of the first query, we know that the OrderPath of the relevant book node is "1/1". Since the nodes for all author information are descendants of the author node (that has NamePath "1/2/6"), which in turn is a child of the "book" node, we can execute the following query to obtain the required result:

"Select NodeValue from DocNodeTable where NamePath like '1/2/6/%' and OrderPath like '1/1/%' Order by Order-Path"

This query returns "Software Engineer, David, Hollenbeck, Chief Architect, Carol, Bohr" in the original document order as the result set.

Now, several enhancements to the system and method described above will be provided. In accordance with another aspect of the invention, the XMLName Table may be cached in memory. In particular, to facilitate construction of the NamePath values, we can store the contents of XMLName Table in a hash table which we keep resident in memory. This prevents the execution of multiple queries against the database to obtain all the necessary XMLName values. In accordance with yet another aspect of the invention, the XMLName values may be divided into NameSpaces. In particular, as the number of XMLName values increases, it may become necessary to divide the values into various namespaces to keep the lengths of the names short. XMLName values from namespaces relevant for working with a particular document can then be brought into the cache when necessary without having to bring the entire XMLNameTable into memory.

In accordance with yet another aspect of the invention, the system may use base-64 encoding. In particular, to reduce the amount of storage required for the XMLName, Name-Path, and OrderPath tables in the relational database, we could consider using a Base-64 encoding scheme instead of alphanumeric strings. In accordance with the invention, it is also possible to add a DigitPath attribute as an adjunct attribute to OrderPath so that the system can ensure proper sorting of nodes while obviating the need for place-holding characters as the number of characters increases. For example, to sort the paths "1/10/2" and "1/2/3" properly, the system would have needed to encode the second as "1/–2/3". However, if we added "1/2/1" and "1/1/1" as DigitPaths and ordered the results by these before OrderPaths, then we would be able to do without the place-holding dashes.

In accordance with the invention, a ReverseNamePath attribute may be automatically generated to further improve the speed of queries. In particular, since it is possible to have an XML document that is an instance of a DTD sub-tree, we may need to evaluate an expression such as:

"Select NodeValue from DocNode Table where Name-Path like '%/1/2/3'"

Since indexes built on NamePath generally do not help in the execution of such queries, we can improve performance by having a ReverseNamePath attribute constructed by reversing the order of the XMLNames in the path expression. Thus, in accordance with the invention, the above query would now read:

"Select NodeValue from DocNodeTable where Reverse-NamePath like '3/2/1/%'"

In accordance with the invention, the system may include a transformation engine that converts XPath expressions into equivalent SQL statements involving NamePath and Order-Path attributes so that the converted queries would then be executed against the repository.

In summary, a system and method for assigning attributes to XML document nodes to facilitate their storage and indexing in relational databases and the subsequent retrieval and re-construction of pertinent nodes and fragments in original document order is provided. Since these queries are performed using relational database query engines, the speed of their execution is significantly faster than that using more exotic systems such as object-oriented databases. Furthermore, this method is portable across all vendor platforms, and so can be deployed at client sites without additional investments in database software.

In accordance with the invention, the hierarchical relationships of XML documents are encoded so that the XML documents may be mapped to a set of relational tables. Once the mapping and encoding is completed, then searching and querying of the XML documents may be done by mapping any XML query language (which is well known) to SQL (also well known) automatically.

While the foregoing has been with reference to a particular embodiment of the invention, it will be appreciated by those skilled in the art that changes in this embodiment may be made without departing from the principles and spirit of the invention as set forth in the appended claims.

The invention claimed is:

1. A computer-implemented method for manipulating a first XML document, the method comprising:
   determining a tree data structure that represents the first XML document, wherein the tree data structure comprises one or more nodes, each node representing an XML element of the first XML document;
   assigning unique name values for a plurality of XML element names in the first XML document by assigning name values to the one or more nodes according to the element names of the XML elements represented by the nodes;
   converting the tree into a table by:
      identifying a node of the tree and a path of nodes from a root node of the tree to the identified node;
      generating name path data indicating the identified path, the name path data comprising a list of name values assigned to one or more nodes in the identified path; and
      storing in the table the name path data; and
   storing the table in a relational database.

2. The method of claim 1, further comprising searching the first XML document by querying the relational database.

3. The method of claim 2, wherein querying the relational database comprises transforming one of an XML Path (Xpath) expression and an XML query to a Structured Query Language (SQL) query.

4. The method of claim 2, further comprising generating a search result.

5. The method of claim 4, wherein the search result comprises a second XML document.

6. The method of claim 1, further comprising storing in the table order path data that indicates the identified path.

7. The method of claim 6, wherein the name path data or the order path data includes a reverse path of nodes from the identified node to the root node.

8. The method of claim 1, further comprising storing in the table data that indicates a name of an XML element represented by the identified node.

9. The method of claim 8, wherein name data is stored in a hash table.

10. The method of claim 8, wherein name data is grouped together categorically.

11. The method of claim 8, wherein name data is encoded using base-64 encoding.

12. The method of claim 1, further comprising storing in the table data that indicates a value of an XML element represented by the identified node.

13. A data structure embodied in computer-readable medium for storing a node representing an XML element of an XML document, the data structure comprising:
   data that indicates a name of an element, and an identified node instantiating the element;
   data that indicates in a first manner a path from a root node to the identified node, the path comprising one or more elements;
   data that indicates, in a second manner the path; and
   data that indicates a value of the identified node.

14. The data structure of claim 13, wherein:
   the data that indicates in the first manner includes a reverse path from the identified node to the root node, the reverse path comprising one or more elements; or
   the data that indicates, in a second manner includes the reverse path.

15. A data structure embodied in computer-readable medium for storing an XML document, the data structure comprising a plurality of sub-data structures, wherein a sub-data structure comprises:
- data that indicates a name of an element, an identified node instantiating the element;
- data that indicates in a first manner a path from a root node to the identified node, the hint path comprising one or more elements;
- data that indicates, in a second manner the path; and
- data that indicates a value of the identified node.

16. A computer-implemented method for manipulating an XML document, the method comprising:
- determining a tree data structure that represents the XML document, wherein the tree data structure comprises one or more nodes, each node representing an XML element of the XML document;
- converting the tree into a table by:
  - identifying a node of the tree;
  - generating name path data and order path data for the identified node, the name path data and the order path data indicating in two different manners a path of nodes from a root node of the tree to the identified node; and
  - storing in the table the name path data and the order path data; and storing the table in a relational database.

17. The method of claim 16, wherein the name path data or the order path data includes a reverse path of nodes from the identified node to the root node.

18. A computer-implemented method for manipulating an XML document, the method comprising:
- determining a tree data structure that represents the XML document, wherein the tree data structure comprises one or more nodes, each node representing an XML element of the XML document;
- converting the tree into a table by:
  - identifying a node of the tree and a path of nodes from a root node of the tree to the identified node;
  - generating order path data for the identified node, the order path data denoting, for a first node in the path of nodes, a breadth-wise enumerated order of the first node in the identified path; and
  - storing in the table the order path data; and
- storing the table in a relational database.

19. The method of claim 18, further comprising storing in the table name path data indicating the identified path.

20. The method of claim 18, wherein the name path data or the order path data includes a reverse path of nodes from the identified node to the root node.

* * * * *

UNITED STATES PATENT AND TRADEMARK OFFICE
CERTIFICATE OF CORRECTION

| | | |
|---|---|---|
| PATENT NO. | : 7,353,222 B2 | Page 1 of 1 |
| APPLICATION NO. | : 10/745762 | |
| DATED | : April 1, 2008 | |
| INVENTOR(S) | : David Dodds et al. | |

It is certified that error appears in the above-identified patent and that said Letters Patent is hereby corrected as shown below:

In the Claims:

In column 11, line 8, col. 14 please replace "the hint path" with --the path--

Signed and Sealed this

Eighth Day of July, 2008

JON W. DUDAS
*Director of the United States Patent and Trademark Office*